(No Model.)
T. A. EDISON.
REGULATOR FOR DYNAMO ELECTRIC MACHINES.
No. 251,555. Patented Dec. 27, 1881.
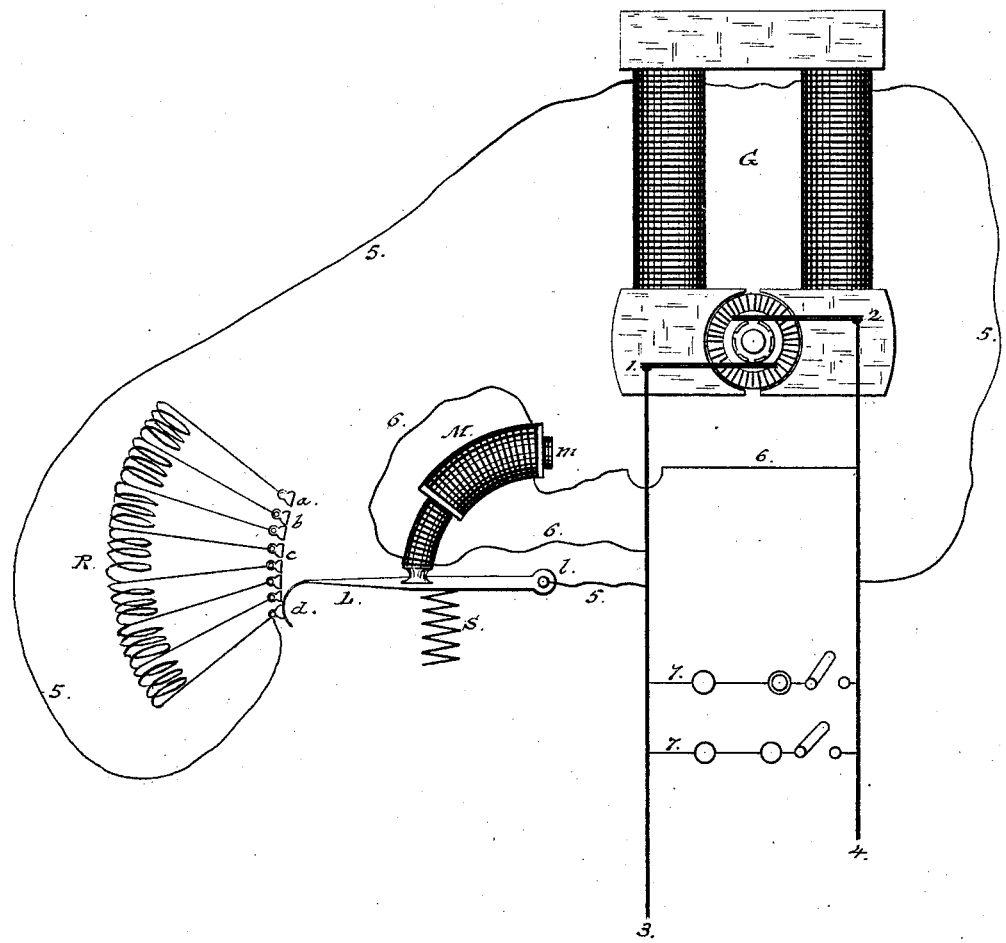
Attest:
D. D. Mott
H. W. Howard
Inventor:
Thos. A. Edison
per Dyer & Wilber
Attys.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 251,555, dated December 27, 1881.

Application filed May 27, 1881. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines; and I do hereby declare that the following is a full and exact description of the same, reference being had to the accompanying drawings, and to the letters of reference marked thereon.

This invention relates to means for automatically controlling the generative force of a magneto or dynamo electric machine, so that the amount and only the amount of current needed in the circuit may be supplied thereto, and the pressure or electro-motive force maintained constant in the circuit. To accomplish this a resistance and switch or lever, by which the circuit may be made independently of or through more or less of the resistance, are included in the circuit energizing the field-of-force magnets. The switch or lever is attached to a magnet playing within a longitudinal opening in a helix, the magnet and helix preferably being longitudinally the segment of a circle and forming an axial magnet, the interior magnet tending, when both are at a maximum of intensity, to place itself so that its center and the center of the coil correspond, in which position it places the switch or lever so that the field-circuit is through all the resistance, while a spring attached to the switch serves, when unresisted, to hold the switch or lever so that it cuts the resistance out. Both coils of this axial magnet are in a circuit derived from the main or consumption circuit. No translating devices being in circuit, the entire exterior circuit is through the coils of the axial magnet only, and it acquires a maximum magnetization, putting all the resistance in the field-circuit, thereby keeping production or generation down to a given point. If, now, translating devices be put in circuit, more exterior circuits are closed and the amount of current flowing through the axial-magnet circuit is lessened, weakening the force of the electro-magnet so that the spring causes the lever or switch to move so as to cut out a portion of the resistance, which is equivalent to strengthening the field-circuit, thus arresting the diminution of current due to putting on more lamps. This is illustrated in the drawings, in which one generator of the dynamo type is shown; but it is to be understood that the principle and means are equally applicable to any type of generator, and to them used singly, or to a number used as a battery.

G is a generator, from whose commutator brushes or springs 1 2 leads the main or consumption circuit 3 4, a derived circuit, 5, therefrom being led around the field-magnets of the generator, in which circuit are included a resistance, R, and switch or lever L.

In a derived circuit, 6, is included the helix M, in which plays, forming the core thereof, the magnet *m*, attached to and moving in one direction the switch or lever L against the resilience of the spring S.

In derived circuits 7 lamps or other translating devices are placed. If these latter circuits be open, whatever current is generated finds its only exterior circuit through 6 M *m*, magnetizing them strongly. Hence *m* is drawn up within M, causing L to contact with R at about *a* or *b*, so that all or nearly all of R is included in the field-circuit 5, so weakening it that the generative force of G is kept at a given point. If 7 be closed, it takes a part of the current, lessening the amount through 6, weakening the force of M *m*, the spring pulls L to, say, *c*, cutting out part of the resistance, strengthening the field-circuit, which results in a proportionate increase of generation of current. As more circuits are closed L is carried from contact to contact of R until finally all or nearly all or as much of R is cut out as is necessary to compensate for the increased demand.

Upon cutting out of 7 the reverse operation takes place.

What I claim is—

1. The combination, with a generator, of a variable resistance in its field-circuit, a magnet in a derived circuit to the main or supply circuit of the generator, and a movable contact-arm controlled by the magnet for effecting an automatic regulation of the field of the generator, substantially as set forth.

2. The combination of a generator, a resistance in its field-circuit, an axial magnet composed of a helix and an electro-magnet as a core thereto, both included in one circuit derived from the main or supply circuit, and a movable contact-arm controlled by the magnet and contacting with the resistance, substantially as set forth.

This specification signed and witnessed this 26th day of February, 1881.

THOS. A. EDISON.

Witnesses:
H. W. SEELY,
RICHD. N. DYER.